(12) United States Patent
Li

(10) Patent No.: US 8,057,172 B2
(45) Date of Patent: Nov. 15, 2011

(54) COOLING FAN WITH OIL-IMPREGNATED BEARING

(75) Inventor: Hong-Guang Li, Sinjhuang (TW)

(73) Assignee: Asia Vital Components Co., Ltd., Sinjhuang (TW)

( * ) Notice: Subject to any disclaimer, the term of this patent is extended or adjusted under 35 U.S.C. 154(b) by 673 days.

(21) Appl. No.: 12/246,827

(22) Filed: Oct. 7, 2008

(65) Prior Publication Data

US 2010/0086395 A1  Apr. 8, 2010

(51) Int. Cl.
*F01D 25/16* (2006.01)
(52) U.S. Cl. .......... 415/229; 415/230; 416/174; 310/90
(58) Field of Classification Search ............... 415/229, 415/230, 231; 416/174
See application file for complete search history.

(56) References Cited

U.S. PATENT DOCUMENTS

| | | | |
|---|---|---|---|
| 6,010,318 A * | 1/2000 | Li | 417/423.13 |
| 6,699,020 B1 * | 3/2004 | Lin | 417/354 |
| 2002/0061149 A1 | 5/2002 | Shingai et al. | |
| 2003/0143086 A1 * | 7/2003 | Shih et al. | 417/354 |
| 2004/0145260 A1 * | 7/2004 | Tamaoka et al. | 310/90 |
| 2004/0239198 A1 * | 12/2004 | Horng et al. | 310/91 |
| 2006/0171620 A1 | 8/2006 | Nakagawa et al. | |
| 2007/0183699 A1 | 8/2007 | Shishido | |
| 2007/0188034 A1 * | 8/2007 | Yoshida | 310/90 |
| 2007/0267928 A1 * | 11/2007 | Yeh et al. | 310/90 |
| 2008/0253888 A1 * | 10/2008 | Hsiao et al. | 415/229 |
| 2009/0053063 A1 * | 2/2009 | Liang et al. | 416/174 |

* cited by examiner

*Primary Examiner* — Stephen W Smoot
(74) *Attorney, Agent, or Firm* — C. G. Mersereau; Nikolai & Mersereau, P.A.

(57) ABSTRACT

A cooling fan with oil-impregnated bearing includes a base portion, a bearing, a fan hub, and a coil assembly. The base portion has a forward extended bearing housing, into which the bearing is tightly fitted with a colloidal material applied between them. The fan hub is mounted on and around the bearing housing, and has a rearward extended rotary shaft extended through a centered shaft hole of the bearing. An oil receiving space is formed on a wall of the shaft hole at a predetermined position. The coil assembly is externally tightly fitted around the bearing housing with a colloidal material applied between them. With the colloidal material, the bearing and the coil assembly can be associated with the bearing housing without detriment to the effective porosity of the bearing and the dimensional precision of the bearing housing. The oil receiving space also prevents the lubricating oil from leaking out.

6 Claims, 4 Drawing Sheets

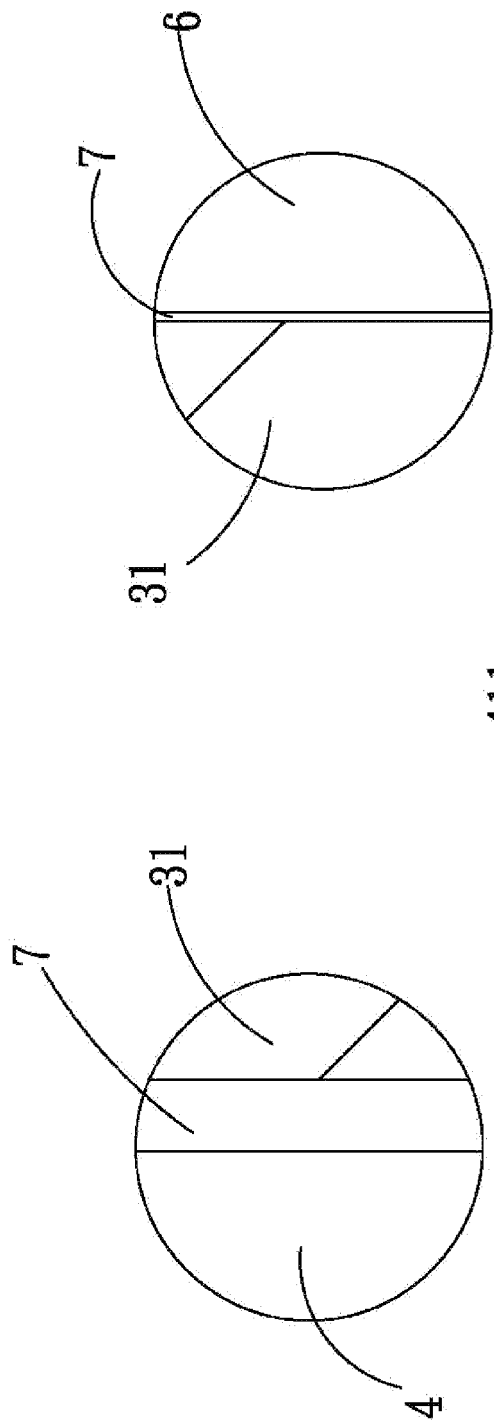
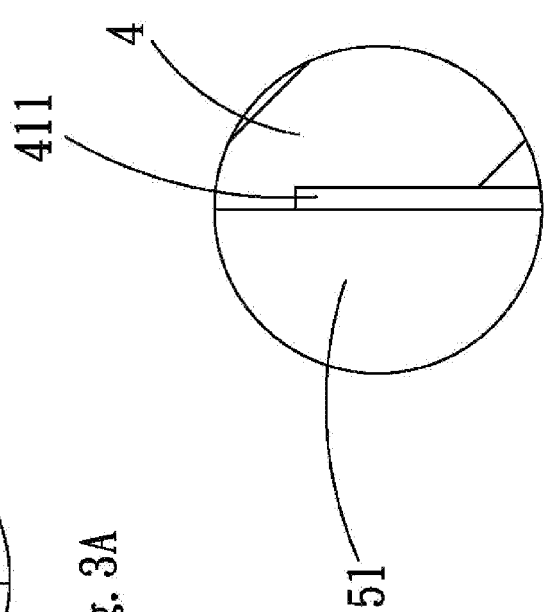
Fig. 3A
Fig. 3B
Fig. 3C

COOLING FAN WITH OIL-IMPREGNATED BEARING

FIELD OF THE INVENTION

The present invention relates to a cooling fan with oil-impregnated bearing, and more particularly to a cooling fan that maintains good component dimensional precision and operates at lowered friction to have prolonged usable life.

BACKGROUND OF THE INVENTION

Recently, various electronic information products, such as computers, have become highly popular among consumers and are widely applied to various fields. The demands for electronic information products lead to rapid development in electronic information techniques. It is a trend to develop electronic information products with increased operating speed and expanded access capacity. When operating at high speed, the components of the electronic information products would also produce a large amount of heat.

For example, among others, the central processing unit (CPU) of a computer produces the largest part of heat in the computer. The CPU would become slow in running when the heat produced and accumulated in the computer gradually increases. When the heat accumulated in the computer exceeds an allowable limit, the computer is subject to the danger of shutdown or even becoming seriously damaged. Moreover, to solve the problem of electromagnetic radiation, a case is used to enclose all the important computer components and elements therein. Therefore, it is very important to quickly dissipate the heat produced by the CPU and other heat-producing elements in the computer case.

Conventionally, a heat sink and a cooling fan are mounted atop the CPU to help in dissipating the heat produced by the CPU. A first side of the heat sink is formed of a plurality of radiating fins, while an opposite second side of the heat sink without radiating fin is in direct contact with the CPU to conduct the heat produced by the CPU to the radiating fins, from where the heat, is radiated into ambient air. Meanwhile, the cooling fan produces airflows to carry away the hot air surrounding the CPU and the heat sink, enabling quick dissipation of heat from the CPU.

Please refer to FIG. 1, which is an assembled sectional view of a conventional cooling fan 1. As shown, the cooling fan 1 includes a main body 11 having a centered locating seat 12 formed on an inner side thereof. The locating seat 12 has a hollow bearing housing 121 protruded therefrom. A bearing 13 is mounted in the bearing housing 121 and a coil 14 is fitted around the bearing housing 121. The cooling fan 1 further includes a fan hub 15, and a plurality of blades 151 spaced along an outer circumferential surface of the fan hub 15. A magnetic ring 152 is mounted to an inner circumferential surface of the fan hub 15 to magnetically interact with the coil 14. A rotary shaft 153 is provided on an inner side of the fan hub 15 to rearward extend through the bearing 13 and thereby hold the bearing in place.

The above-described cooling fan has some disadvantages in practical use thereof. For example, the coil 14 is forcedly pushed to locate around the bearing housing 121 in a tight-fit relation. Also, the bearing 13 is forcedly pushed into the bearing housing 121 to tightly fit therein. When forcedly pushing the coil 14 to locate it around the bearing housing 121, it is likely to cause detriment to the verticality of the bearing housing 121. And, when forcedly pushing the bearing 13 into the bearing housing 121, stress is concentrated at an end face of the bearing 13 to adversely affect the effective porosity of the bearing 13. As a result, noise will be produced while the cooling fan 1 operates and the usable life of the cooling fan 1 will be shortened. Moreover, when the rotary shaft 153 is first assembled to the bearing 13, an amount of lubricating oil is added to a rear end of the bearing 13. When the cooling fan 1 operates continuously to rotate the blades 151, the lubricating oil would move forward along the rotary shaft 153 and flow out of the bearing housing 121. As a result, the amount of the lubricating oil in the bearing 13 will reduce gradually to cause dry friction between the bearing 13 and the rotary shaft 153.

According to the aforesaid, the conventional cooling fan 1 has the following disadvantages: (1) The bearing housing tends to lose its verticality; (2) The bearing tends to lose its effective porosity; (3) The lubricating oil is likely to leak out; and (4) Noises are produced when the cooling fan operates and the usable life of the cooling fan is shortened.

SUMMARY OF THE INVENTION

A primary object of the present invention is to provide a cooling fan with oil-impregnated bearing, which is durable for use and maintains good component dimensional precision.

Another object of the present invention is to provide a cooling fan with oil-impregnated bearing, which has an oil receiving space formed on a wall of a shaft hole of the bearing to retain lubricating oil therein. Accordingly, it is not necessary to further add any lubricating oil between the bearing and a rotary shaft of the cooling fan, and the lubricating oil between the bearing and the rotary shaft is prevented from moving forward along the rotary shaft due to a centrifugal force when the cooling fan operates. Therefore, leakage of the lubricating oil can be avoided.

To achieve the above and other objects, the cooling fan with oil-impregnated bearing according to the present invention includes a base portion, a bearing, a fan hub, and a coil assembly. The base portion has a forward bearing housing, in which the bearing is mounted in a tight-fit relation. The fan hub is mounted on and around the bearing housing. The fan hub is provided on an inner side with a rotary shaft rearward extended through a centered shaft hole of the bearing. The coil assembly is mounted around the bearing housing in a tight-fit relation. A colloidal material is applied between the coil assembly and the bearing housing, as well as between the bearing housing and the bearing.

With the colloidal material, the bearing and the coil assembly can be associated with the bearing housing without detriment to the dimensional precision of the bearing and the bearing housing. The oil receiving space also prevents the lubricating oil from leaking out.

With the above arrangements, the cooling fan of the present invention has the following advantages: (1) The bearing housing would not lose its verticality; (2) The bearing would not lose its effective porosity; (3) The leakage of lubricating oil can be effectively prevented; and (4) Noise during cooling fan operation is prevented and the usable life of the cooling fan can be prolonged.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein:

FIG. 3A is an enlarged view of the circled area 3A of FIG. 3;

FIG. 3B is an enlarged view of the circled area 3B of FIG. 3; and

FIG. 3C is an enlarged view of the circled area 3C of FIG. 3.

DETAILED DESCRIPTION OF THE PREFERRED EMBODIMENTS

Figure 1:
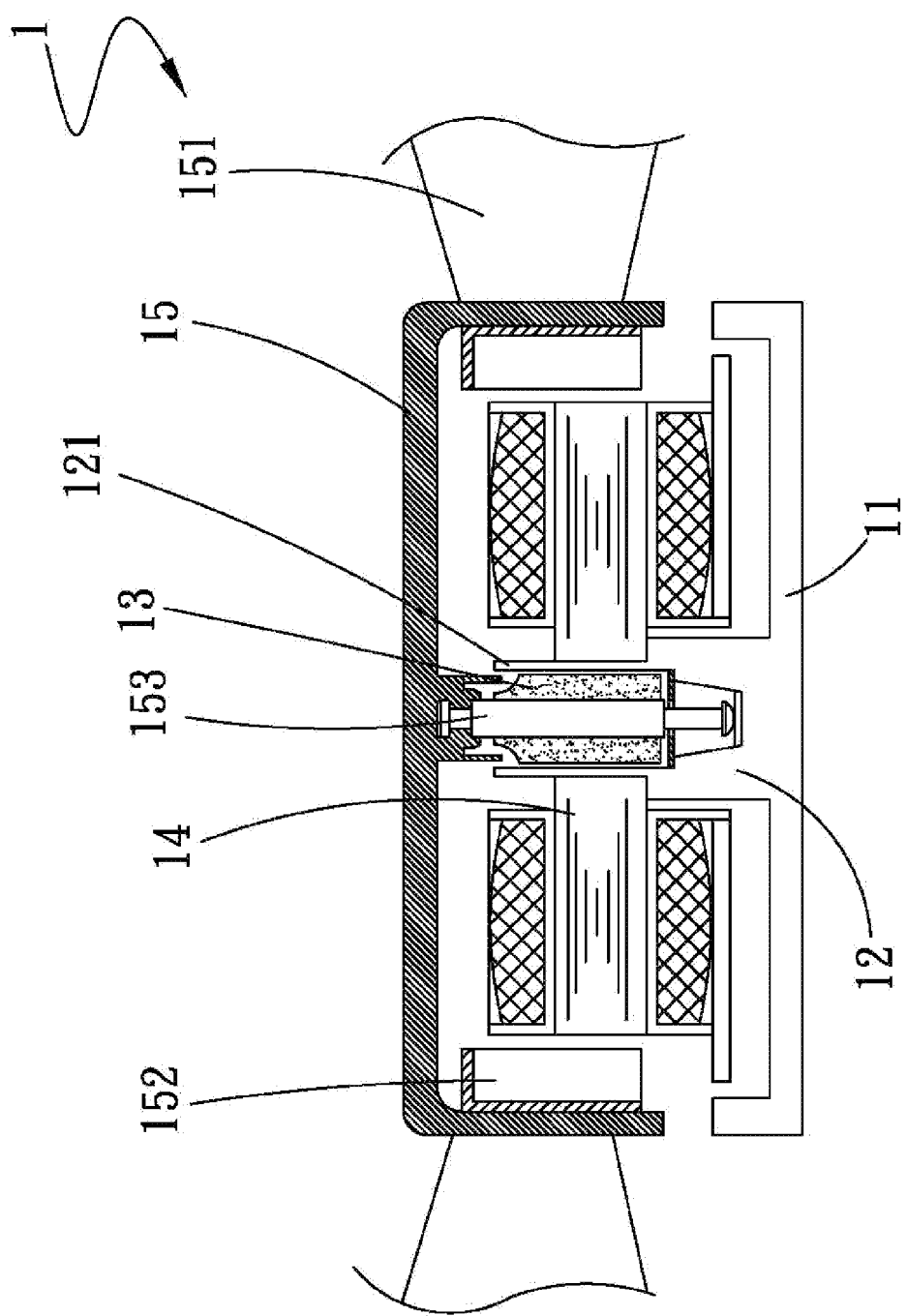
FIG. 1 is an assembled sectional view of a conventional cooling fan.
Figure 2:
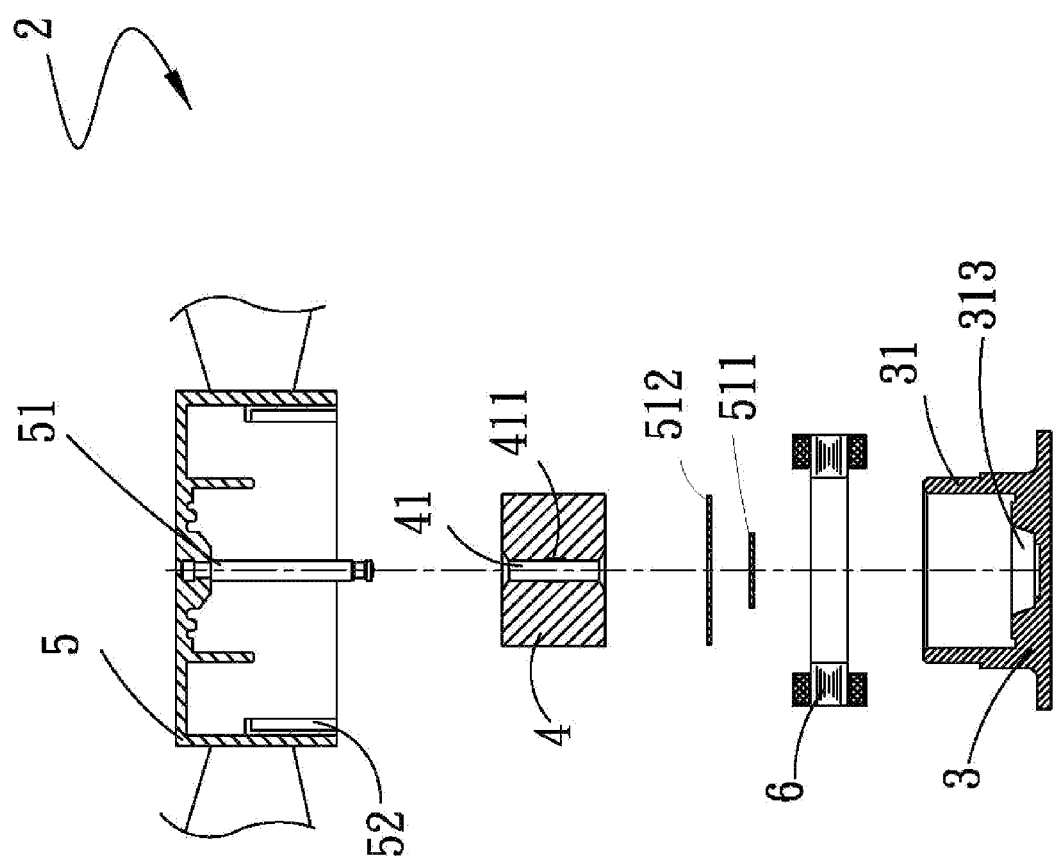
FIG. 2 is an exploded sectional view of a cooling fan according to a preferred embodiment of the present invention.
Figure 3:
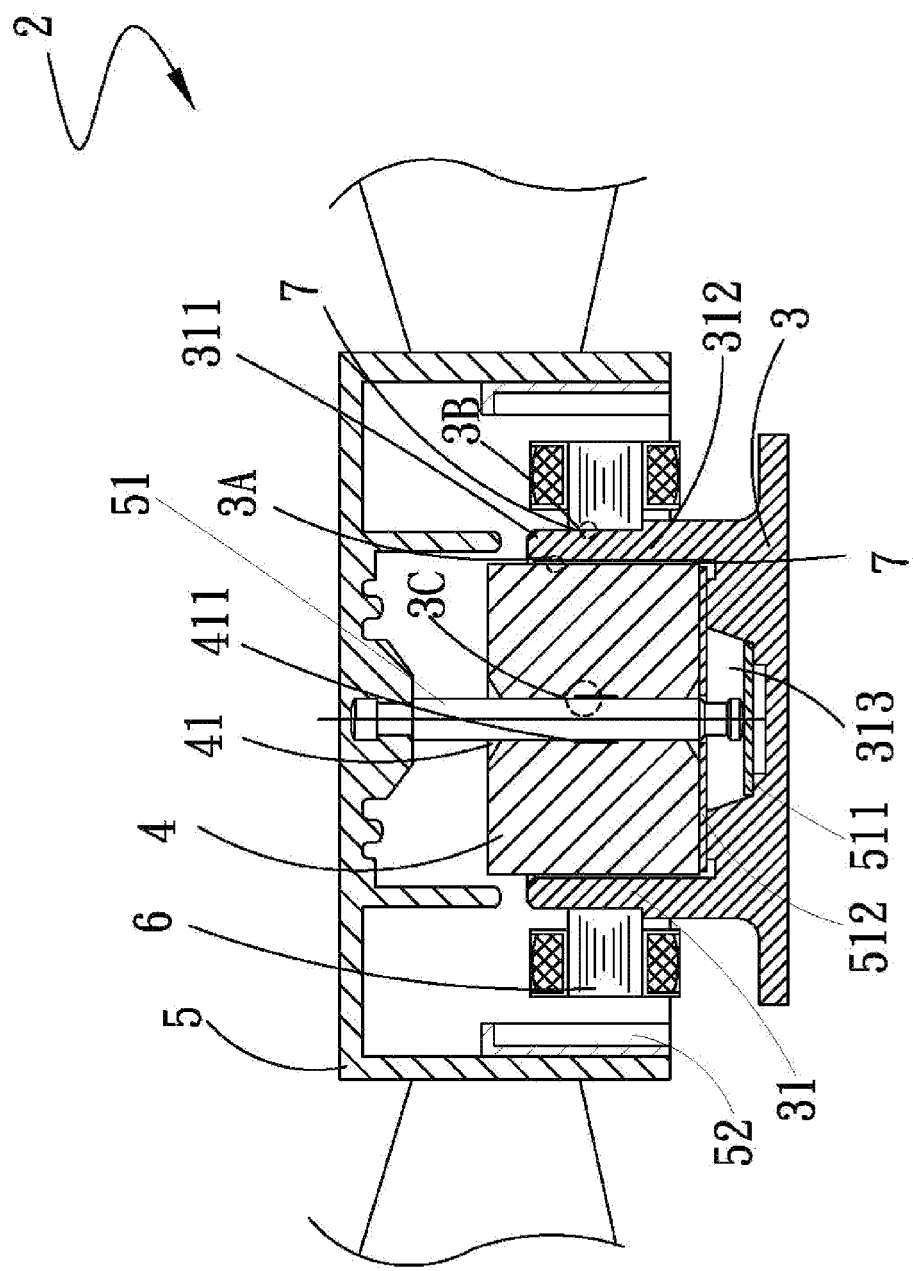
FIG. 3 is an assembled view of FIG. 2.

Please refer to FIGS. 2 and 3, in which a cooling fan with oil-impregnated bearing according to a preferred embodiment of the present invention is shown. As shown, the cooling fan of the present invention as generally denoted by reference numeral 2 includes a base portion 3, a bearing 4, a fan hub 5, and a coil assembly 6. The base portion 3 can be mounted in a fan frame or on a heat sink. The base portion 3 has a forward extended bearing housing 31 formed thereon for receiving the bearing 4 therein. The bearing 4 is associated with the bearing housing 31 in a tight-fit relation. The fan hub 5 is mounted on and around the bearing housing 31. The fan hub 5 has a rearward extended central rotary shaft 51. The rotary shaft 51 is rotatably extended through a centered shaft hole 41 of the bearing 4, so that the fan hub 5 is rotatably mounted on the base portion 3.

The bearing housing 31 has a first end 311 and a second end 312. The first end 311 defines an opening communicating with an interior of the bearing housing 31. The second end 312 is internally formed with an oil receptacle 313. A wear plate 511 and at least one retaining member 512 are sequentially disposed in the second end 312 corresponding to the rotary shaft 51. In the illustrated preferred embodiment, the second end 312 is a closed end. However, it is understood the second end 312 can be otherwise an open end scalable by a bottom cover (not shown).

The coil assembly 6 is externally located around the bearing housing 31 and associated with the bearing housing 31 in a tight-fit relation to effectively increase the tightness between the coil assembly 6 and the bearing housing 31. A magnetic ring 52 is mounted on an inner circumferential surface of the fan hub 5 to space from and locate around the coil assembly 6, so that the magnetic ring 52 can magnetically interact with the coil assembly 6 to thereby drive the fan hub 5 and the rotary shaft 51 to rotate relative to the base portion 3 to achieve the purpose of dissipating heat.

FIGS. 3A, 3B, and 3C are enlarged views of the circled areas 3A, 3B, and 3C of FIG. 3, respectively. Please now refer to FIG. 3 along with FIGS. 3A, 3B, and 3C. According to FIG. 3, the bearing housing 31 is perpendicularly extended from the base portion 3. The coil assembly 6 is located around and associated with the bearing housing 31 in a tight-fit relation. A colloidal material 7 is applied to an outer circumferential surface of the bearing housing 31 and an inner circumferential surface of the coil assembly 6. When the coil assembly 6 is tightly fitted around the bearing housing 31, the colloidal material 7 prevents the coil assembly 6 from adversely affecting the verticality of the bearing housing 31. The bearing 4 is mounted in the bearing housing 31 in a tight-fit relation. Similarly, a colloidal material 7 is applied to an outer circumferential surface of the bearing 4 and an inner circumferential surface of the bearing housing 31. When the bearing 4 is mounted into the bearing housing 31, the colloidal material 7 prevents the bearing 4 from adversely affecting the verticality of the bearing housing 3. Moreover, the rotary shaft 51 is extended through and received in the centered shaft hole 41 of the bearing 4 with an end of the rotary shaft 51 corresponding to the base portion 3 being held by the retaining member 512 to stay in the oil receptacle 313. An oil receiving space 411 is formed around a wall of the centered shaft hole 41 of the bearing 4 at a predetermined position for holding an amount of lubricating oil therein. With the lubricating oil provided on the wall of the shaft hole 41, it is not necessary to further add any lubricating oil between the rotary shaft 51 and the bearing 4 when the rotary shaft 51 rotates in the bearing 4 for the first time. The lubricating oil in the oil receiving space 411 also prevents dry friction between tire rotary shaft 51 and the bearing 4. The oil receiving space 411 can be axially or spirally extended along the wall of the centered shaft hole 41.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A cooling fan with oil-impregnated bearing, comprising:
    a base portion having a bearing housing forward extended from the base portion;
    a bearing being mounted in the bearing housing with a colloidal material applied between the bearing and an inner circumferential surface of the bearing housing;
    a fan hub being mounted on and around the bearing housing, the fan hub being provided on an inner side with a rearward extended rotary shaft, and the rotary shaft being extended through the bearing; and
    a coil assembly being externally fitted around the bearing housing with a colloidal material applied between the coil assembly and an outer circumferential surface of the bearing housing.

2. The cooling fan with oil-impregnated bearing as claimed in claim 1, wherein the bearing is pushed into the bearing housing to associate with the bearing housing in a tight-fit relation, so that an increased tightness between the bearing and the bearing housing is obtained.

3. The cooling fan with oil-impregnated bearing as claimed in claim 1, wherein the coil assembly is pushed onto the bearing housing to associate with the bearing housing in a tight-fit relation, so that an increased tightness between the coil assembly and the bearing housing is obtained.

4. The cooling fan with oil-impregnated bearing as claimed in claim 1, wherein the bearing has a centered shaft hole, through which the rotary shaft is extended, and an oil receiving space being formed on a wall of the centered shaft hole at a predetermined position.

5. The cooling fan with oil-impregnated bearing as claimed in claim 4, wherein the oil receiving space is axially extended along the centered shaft hole.

6. The cooling fan with oil-impregnated bearing as claimed in claim 1, wherein the oil receiving space is spirally extended along the centered shaft hole.

* * * * *